US008293155B2

United States Patent
Hafer

(10) Patent No.: US 8,293,155 B2
(45) Date of Patent: Oct. 23, 2012

(54) METHOD AND APPARATUS FOR STAMPING AND CUTTING PLASTIC PARTS

(75) Inventor: Udo Hafer, Witten (DE)

(73) Assignee: KraussMaffei Technologies GmbH, München (DE)

( * ) Notice: Subject to any disclaimer, the term of this patent is extended or adjusted under 35 U.S.C. 154(b) by 230 days.

(21) Appl. No.: 12/536,062

(22) Filed: Aug. 5, 2009

(65) Prior Publication Data

US 2010/0038829 A1 Feb. 18, 2010

(30) Foreign Application Priority Data

Aug. 13, 2008 (DE) .................... 10 2008 038 988

(51) Int. Cl.
*B28B 7/14* (2006.01)
*B29B 13/08* (2006.01)

(52) U.S. Cl. ..... 264/163; 425/385; 425/398; 425/174.4; 264/482; 219/121.67

(58) Field of Classification Search ............... 264/482, 264/163; 425/385, 394, 398, 174.4, 210, 425/289, 304; 219/121.67
See application file for complete search history.

(56) References Cited

U.S. PATENT DOCUMENTS

| 4,409,463 A * | 10/1983 | Duruz et al. ............. 219/121.67 |
|---|---|---|
| 4,434,349 A * | 2/1984 | Tsutsumi ............... 219/121.67 |
| 4,650,952 A * | 3/1987 | Akeel .................... 219/121.74 |
| 4,728,771 A * | 3/1988 | Sartorio ................. 219/121.72 |
| 4,950,861 A | 8/1990 | Erlenmaier et al. |
| 5,474,437 A * | 12/1995 | Kuroyone ................ 425/150 |
| 5,585,015 A * | 12/1996 | Hayashi et al. ......... 219/121.67 |
| 6,007,756 A * | 12/1999 | Weiteder et al. ........... 264/400 |
| 6,046,427 A * | 4/2000 | Richter et al. .......... 219/121.67 |
| 6,144,009 A * | 11/2000 | Ulrich ................... 219/121.67 |
| 6,710,291 B1 * | 3/2004 | Wegener et al. ........ 219/121.72 |
| 6,908,295 B2 * | 6/2005 | Thielman et al. ............ 425/371 |
| 7,712,396 B2 * | 5/2010 | Holmquist et al. .......... 76/107.1 |
| 7,800,087 B2 * | 9/2010 | Pieger .................... 250/517.1 |
| 2002/0189295 A1 * | 12/2002 | Bennett et al. ............... 65/173 |
| 2003/0102591 A1 * | 6/2003 | Thielman et al. ............. 264/166 |
| 2006/0272378 A1 | 12/2006 | Amino et al. |
| 2007/0193988 A1 | 8/2007 | De Joannis et al. |
| 2008/0217821 A1 * | 9/2008 | Goring et al. ................ 264/482 |
| 2010/0152870 A1 * | 6/2010 | Wanner et al. ................ 700/97 |
| 2010/0298973 A1 * | 11/2010 | Doke et al. ................. 700/230 |
| 2011/0178619 A1 * | 7/2011 | Jung et al. .................. 700/95 |

FOREIGN PATENT DOCUMENTS

DE 198 53 366 A1 5/2000
EP 1 908 546 A1 4/2008

* cited by examiner

*Primary Examiner* — Joseph Del Sole
*Assistant Examiner* — Nahida Sultana
(74) *Attorney, Agent, or Firm* — Henry M. Feiereisen, LLC

(57) ABSTRACT

Apparatus for stamping and cutting a plastic part includes a housing for accommodating a stamping press. The stamping press has a lower tool part, an upper tool part, and a drive for moving the lower and upper tool parts in relation to one another. A robot having a robot arm is constructed to move into a work zone of the stamping press, when the stamping press is open and thereby enable a laser device disposed on the robot arm to perform suitable cutting operations of the plastic part.

6 Claims, 1 Drawing Sheet

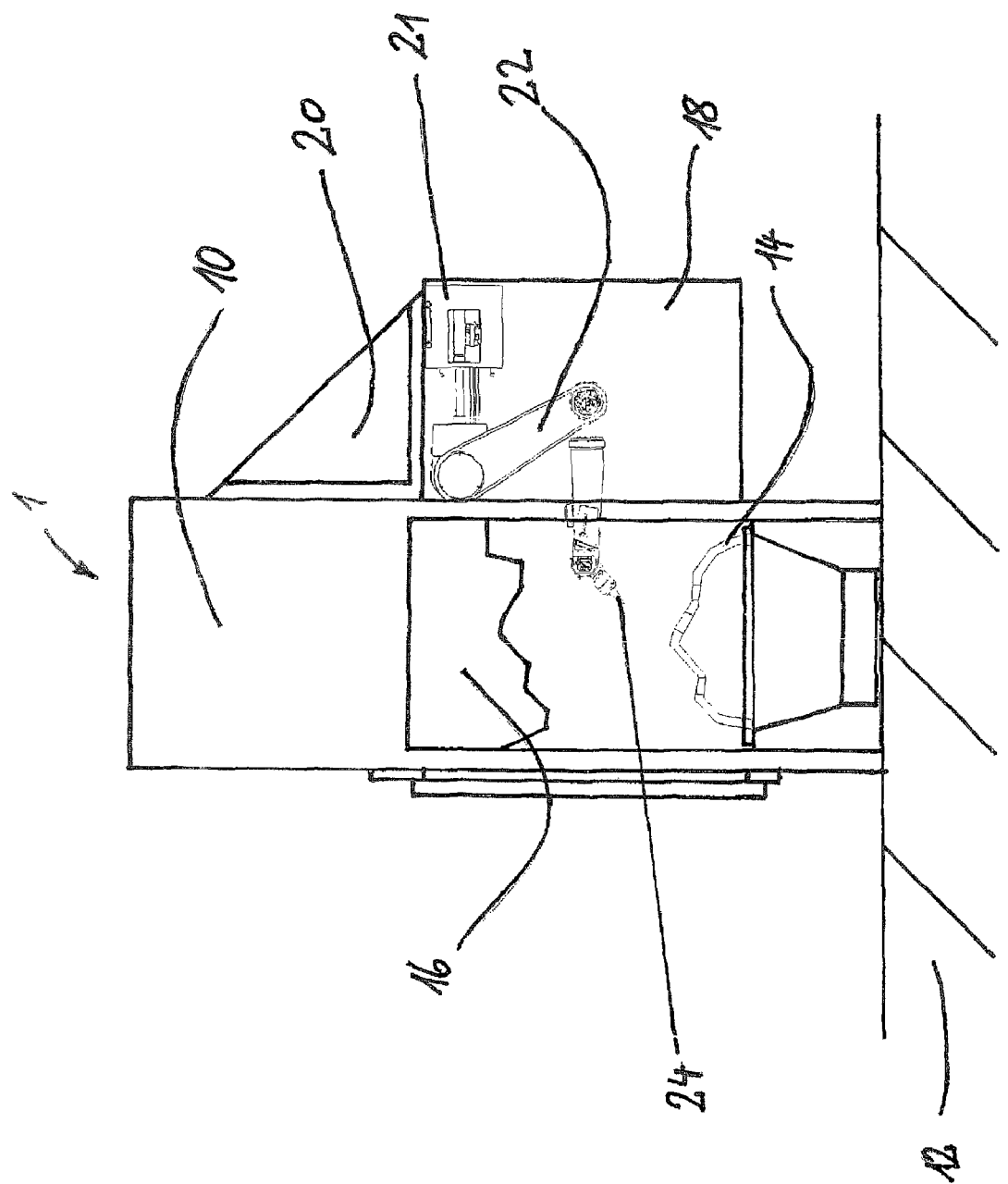

METHOD AND APPARATUS FOR STAMPING AND CUTTING PLASTIC PARTS

CROSS-REFERENCES TO RELATED APPLICATIONS

This application claims the priority of German Patent Application, Serial No. DE 10 2008 038 988.9, filed Aug. 13, 2008, pursuant to 35 U.S.C. 119(a)-(d), the content of which is incorporated herein by reference in its entirety as if fully set forth herein.

BACKGROUND OF THE INVENTION

The present invention relates to a method and apparatus for stamping and cutting plastic parts.

The following discussion of related art is provided to assist the reader in understanding the advantages of the invention, and is not to be construed as an admission that this related art is prior art to this invention.

Multilayered plastic parts find application in the automobile industry for example, and typically include a plastic carrier which is covered by a layer of semi-hardened polyurethane foam which in turn is covered on the visible side by a decorative surface layer of thin plastic material. The various layers are applied successively during production of such multilayered plastic parts. Multilayered plastic parts are semi-finished products which often are required to have cut edges and openings. In order to obtain such a cut edge, it is customary to finish them by means of a stamping operation or milling operation or a combination of both methods.

The various operating steps for cutting of the semi-finished product are normally executed in succession in different work stations. Using different work stations is needed because of the complex geometric shapes of the parts to be machined, rendering the application of a single cutting operation impossible. As a result, the stamping operation is normally followed by a flexible cutting process to finish the semi-finished product and to provide the multilayered plastic part with openings or recesses.

Conceivably, a first stamping step may be followed by a second stamping step, although normally the second operating step involves milling to work on regions which cannot be stamped for geometric reasons. Executing a milling step after the stamping operation involves the use of a hydraulic machine with a milling cell in which the previously stamped plastic part is placed and worked on. Thus, it is required to remove the plastic part from a first stamping station and then place it into the milling cell. This causes an adding up of various tolerances which result in an overall tolerance that in many cases is unacceptable. A particular problem is the implementation of the second cut with tolerance with respect to the first cut.

To address the problem of adding up tolerances, it is proposed to directly finish the previously stamped plastic part in the stamping press by attaching a milling robot directly onto the stamping tool. The milling robot then immediately mills those regions that cannot be stamped during the initial stamping operation. This causes however shavings that accumulate, thereby rendering a precision stamping of a subsequent part in the same stamping press impossible.

It would therefore be desirable and advantageous to address this problem and to obviate other prior art shortcomings and to realize consistently desired tolerances, even when complex geometries are involved.

SUMMARY OF THE INVENTION

According to one aspect of the present invention, an apparatus for stamping and cutting a plastic part includes a housing, a stamping press received in the housing and having a lower tool part, an upper tool part, and a drive for moving the lower and upper tool parts in relation to one another, a robot having a robot arm and constructed to move into a work zone of the stamping press, when the stamping press is open, and a laser device disposed on the robot arm.

As the robot arm is able to move into the work zone of the stamping press, when the stamping press is open, the laser device on the robot arm can thus be positioned in the work zone to cut even complex geometries without material removal. The present invention thus resolves prior art problems by applying a contactless laser cutting operation to replace a material-removing milling operation.

According to another advantageous feature of the present invention, the laser device can be constructed to generate a $CO_2$ laser.

As the laser operation produces vapor as a result of evaporation of plastic material, it is advantageous to provide a suction device by which generated vapor can be removed from the work zone when a workpiece is subjected to a cut by the laser device. The suction device may hereby advantageously be arranged in a lower and/or upper region of the housing of the stamping press. Air guides may further be provided to directly withdraw vapor encountered in the cutting regions. The product holder is hereby especially suitable for vapor removal during the stamping step.

According to another advantageous feature of the present invention, the housing may have at least one region provided with a light-proof screen to protect an operator during the laser operation. As the operator is required to be protected already during the stamping operation against any risk emanating from the apparatus, the presence of a light screen does not add costs. It is only required to provide doors for possible openings to ensure a light-proof screening.

An apparatus according to the present invention has the benefits of eliminating the need for a transfer operation to another station in order to execute a subsequent cutting operation, thereby simplifying handling, and of executing the laser cut in a same disposition of the plastic part as the first cutting operation, such as first stamping operation, thereby preventing introduction of further tolerances into the overall machining process.

According to one aspect of the present invention, a method of stamping and cutting a plastic part includes the steps of subjecting a multilayered plastic part to a stamping process in a stamping press, moving a laser device from outside into a work zone inside the stamping press, and cutting the multilayered plastic part in the work zone by the laser device to a desired shape.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of a stamping and cutting apparatus according to the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a schematic illustration of a stamping and cutting apparatus according to the present invention, including a stamping press, generally designated by reference numeral 1 and including a housing 10 and a lower tool part 14 which is securely fixed to a foundation 12 on the ground via a support and held in the housing 10. The housing 10 is hereby also arranged on the same foundation. The stamping press 1 further includes an upper tool part 16 which is positioned above the lower tool part 14 in the housing 10 and is operated by a not shown drive in a vertical direction in relation to the lower tool part 14 for stamping a multilayered plastic product placed between the lower and upper tool parts 14, 16. Structure and mode of operation of such a stamping press 1 is generally known to the artisan so that further discussion thereof is not necessary.

Arranged on one side of the housing 10 of the stamping press 1, here by way of example the backside of the housing 10 on the right-hand side of the FIGURE, is a further housing 18 which is secured to the housing 10 of the stamping press 1 by a fastening flange 20. The housing 18 accommodates a multi-axis robot arm 22 of a 5- or 6-axis computer-programmed robot. Although not shown in detail, the robot has plural drives in a manner known per se to operate individual movement elements. By way of example, one drive is shown here and designated by reference numeral 21. The robot arm 22 has one end to support a laser device 24 which produces a $CO_2$ laser.

The backside of the housing 10 of the stamping press 1 has an opening to allow the robot arm 22 to move the laser device 24 into a work zone of the stamping press 1 between the lower and upper tool parts 14, 16, as shown in the FIGURE. The robot arm 22 may be constructed to move and swivel across the entire area of the lower tool part 14 to respectively position the laser device 24 and thereby allow execution of any desired laser cut even of most complex geometries.

At operation of the stamping and cutting apparatus according to the present invention, a produced semi-finished product in the form of a multilayered plastic part is transferred into the open stamping press 1 between the lower and upper tool parts 14, 16 and placed upon the lower tool part 14. This can be realized by a not shown handling arm. The stamping press 1 is then activated to lower the upper tool part 16 and to perform the stamping operation. The robot arm 22 is still in a fully retracted position inside the housing 18 and thus still removed from the housing 10. After conclusion of the stamping operation, the stamping press 1 is opened to allow the robot arm 22 to enter the work zone inside the housing 10. In the work zone, the robot arm 22 is operated in a programmed fashion to execute cutting operations according to predefined geometries. Any vapor caused during the cutting operations is removed by a not shown suction device and cleaned later. After cutting the multilayered plastic part, the robot arm 22 is moved back into its housing 18 and the finished multilayered plastic part can be removed from the stamping press 10. A new cycle may commence again.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for stamping and cutting a plastic part, comprising:
   a housing;
   a stamping press received in the housing and having a lower tool part, an upper tool part, and a drive for moving the lower and upper tool parts in relation to one another;
   a robot having a robot arm and constructed to move into a work zone of the stamping press, when the stamping press is open; and
   a laser device disposed on the robot arm, said laser device being constructed to engage through an opening of the housing into the work zone.

2. The apparatus of claim 1, further comprising a suction device to withdraw vapor from the work zone when a workpiece is subjected to a cut by the laser device.

3. The apparatus of claim 2, wherein the suction device is arranged in the housing of the stamping press.

4. The apparatus of claim 1, wherein the laser device is constructed to generate a $CO_2$ laser.

5. The apparatus of claim 1, wherein the housing has at least one zone provided with a light-proof screen.

6. The apparatus of claim 1, wherein the laser device is arranged on a housing wall.

\* \* \* \* \*